Feb. 23, 1960 J. W. SMITH ET AL 2,926,346

REMOTE CONTROL SYSTEM

Filed April 6, 1955 2 Sheets-Sheet 1

INVENTOR.
JOHN W. SMITH
PAUL G. WULFSBERG

BY [signature]

ATTORNEY

INVENTOR.
JOHN W. SMITH
PAUL G. WULFSBERG
BY
ATTORNEY 2,926,346

REMOTE CONTROL SYSTEM

John W. Smith and Paul G. Wulfsberg, Cedar Rapids, Iowa, assignors to Collins Radio Company, Cedar Rapids, Iowa, a corporation of Iowa Application April 6, 1955, Serial No. 499,564

3 Claims. (Cl. 340—347)

Figure 1:
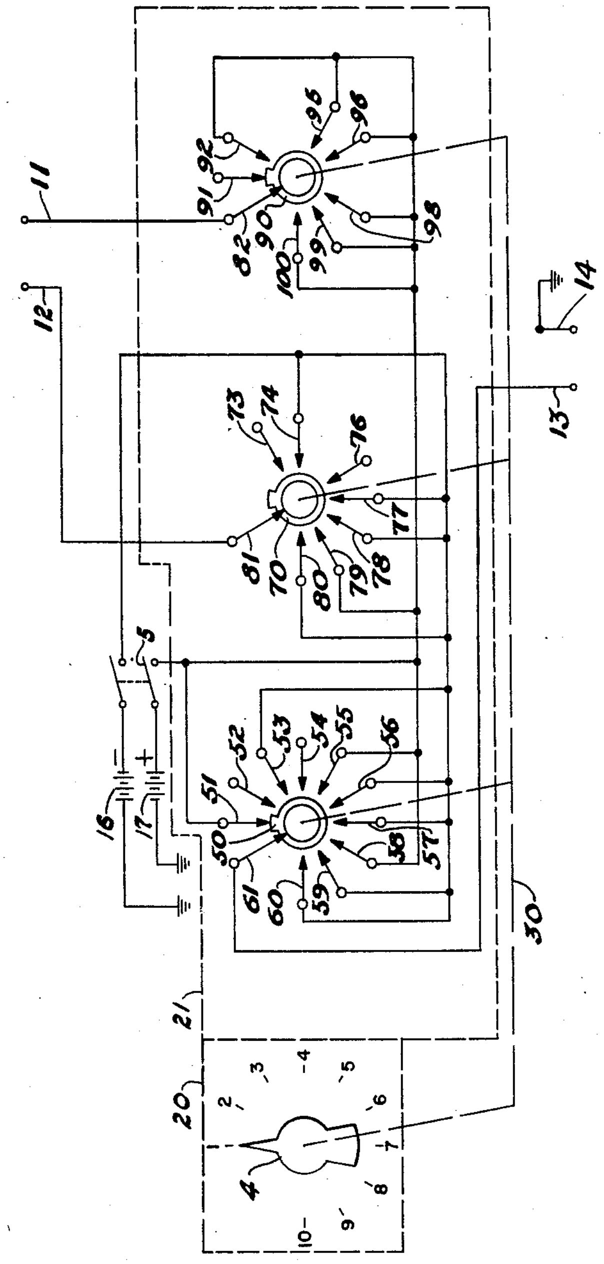

This invention relates to remote control systems and more particularly to such systems designed to operate over long distances between the control position and the controlled position.

Priorly, remote control systems have generally been operated using a binary code. Binary codes are well known in the art and occur when either one of two conditions can exist on a given wire. Binary codes have been utilized in remote control systems because elements such as relays and switches are peculiarly adapted to use with a normal binary code which imposes either an off or an on condition on a given wire. Binary codes are thus able to control shaft positioning apparatus wherein permutations on the coder and decoder are matched and to control this apparatus economically. Such a system of shaft positioning is fully described and claimed in United States Patent 2,476,673, issued to R. W. May et al. on July 19, 1949, and assigned to the assignee of the present invention.

Binary codes by definition require a specific number of transmission wires to control a specific number of positions or positioning apparatus. It has been established and is well known in the art that "$n$" wires are required to transmit $2^n$ code combinations in a binary code system. The number of binary code combinations which normally can be transmitted and utilized using the off and on code symbols is $2^n-1$. The binary code combination which is not usable is called a "lost" or a "dead" position. This dead position occurs because in the sequence of code combinations, the combination comprising "no signal" on all of the wires cannot actuate the usual permutation system. Thus a complete "no signal" code combination on the control side of the remote control system cannot be utilized to control the positioning of the controlled side because the code combination contains no usable information.

The remote control systems using binary codes have developed rapidly due to their wire-saving aspects and the simplicity of the requisite coding and decoding equipment. The binary code systems which do not utilize wires as connecting elements obviously do not need wire-saving devices, but these non-wire systems have the disadvantages that they do not present continuous selection information and/or are subject to errors due to outside influences. Thus, the binary code systems using wires as connecting elements have generally superior operating characteristics when compared to the non-wire systems.

The wire saving occurs when the necessary transmission lines between the control and the controlled positions are reduced in number. Thus, the more information each wire is able to carry and the associated controlled system is able to obey results in a wire saving. This invention saves wire by sending and using more than $2^n$ code combinations on $n$ wires. This invention in one specific embodiment sends ten code combinations on three wires. A pure binary coding system as ordinarily used is capable of sending only eight code combinations, as denoted in the formula $$2^n = \text{code combinations}$$

where $n$ is the number of wires.

This invention also controls ten code positions over three wires, while a pure binary system can control only seven code positions on three wires due to the dead position.

This invention saves wire when compared to the normal binary code combination remote control system. In this invention some of the transmission line wires carry trinary code combinations and some of the transmission lines carry binary code combinations.

Trinary code combinations occur when three electrical conditions are imposed on a given transmission line wire. A trinary code can control $3^n-1$ code positions on $n$ wires. The normal trinary system will also lose the dead position which is the code combination when all wires are in an off condition. A complete trinary coding system is fully described and claimed in a co-pending application Serial No. 499,649, which is assigned to the assignee of the present invention.

This invention has a converter-repeater mechanism which converts the trinary code combinations to binary code combinations for application to the decoding device. This converter-repeater unit also repeats the binary code combinations which have been impressed on it and thereby eliminates the reactive carry-over which occurs on long transmission lines.

It is an object of this invention to provide a remote control system which will economically select any one of a plurality of control positions. It is another object of this invention to provide a remote control system which will present selection information continuously on the fewest possible number of wires.

It is a still further object of this invention to provide a remote control system which is operable with direct current. It is another object of this invention to provide more than $2^n-1$ controlled positions using $n$ wires.

It is another object of this invention to provide a remote control system which operates using binary and trinary codes and has a controlled unit responsive to various code combinations of binary and trinary codes.

Figures 2, 3:
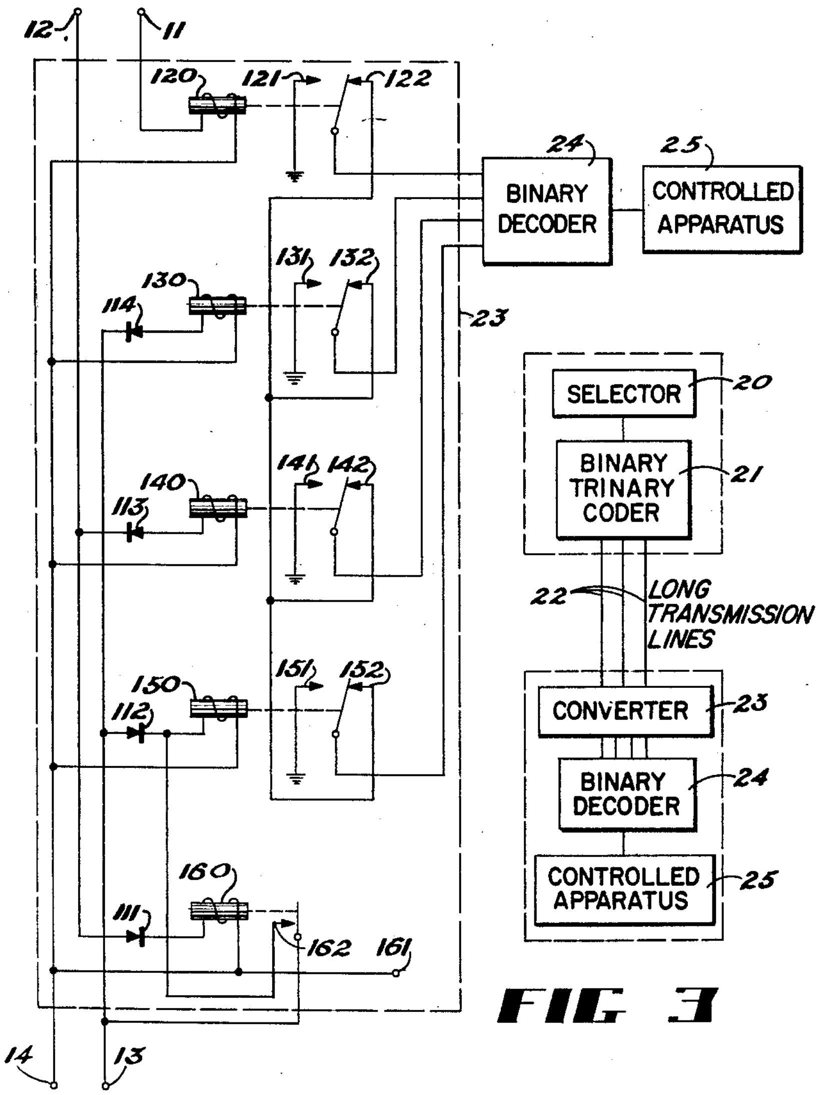

These and other objects of this invention will become apparent when the following description is read in conjunction with the accompanying drawings, in which Figure 1 is a schematic diagram of one control unit of one illustrative embodiment of this invention;

Figure 2 is a schematic diagram of one controlled unit of the same illustrative embodiment of this invention; and Figure 3 is a schematic diagram of the general form of this invention.

Referring now to Figure 3, the selector 20 must be variable so as to select a desired position and must also control the operation of the binary-trinary coder 21. In one specific illustrative embodiment as shown in Figure 1, control knob 4 and the mechanical linkages connected to the shaft to which this control knob is connected become a selector unit. The binary-trinary coder 21 must impose the requisite code combinations on the transmission lines 22. It is to be noted that the binary and trinary code combinations are generated individually and placed individually on certain of the transmission line wires. This binary-trinary coder may generate any number of binary and/or any number of trinary code combinations to correlate the number of transmission line wires to the control requirements.

In Figure 1, this binary-trinary coder consists of three contact rings 50, 70, and 90. These rings are mechanically linked by shafting or other mechanical means to the selector knob 4 and are thus controlled by the motion of the selector knob 4.

The transmission lines which connect the units depicted in Figure 1 and Figure 2 are usually of considerable length because the control unit of Figure 1 and the controlled unit of Figure 2 are usually separated by considerable distance. The code combinations which are sent over these wires carry the selection information between the control unit and the controlled unit. The number of wires needed to carry the desired information is of great economical importance and this invention reduces the number of wires required, and thereby greatly saves the total quantity of wire needed in the system. These wires terminate in the controlled unit in a converter-repeater unit 23. This converter unit 23 is required since the code combinations received, i.e., the combination of trinary code on some of the wires and a binary code on other wires, is not readily applicable directly to the controlled apparatus. Some device should be used to convert the combinations of binary and trinary codes to a pure binary code to apply to a controlled apparatus. This converter-repeater unit is also utilized to repeat the signals which will be weak and will have a reactive carry-over. This repetition is necessary so that the over-all system will work quickly and properly during the search period of the controlled units. This binary-trinary code system may be applied to a properly designed controlled apparatus directly; however, in view of the ease with which it can be converted to a pure binary code combination, and additionally because of this required repetition, a converter-repeater unit is provided.

The binary code which is the output of the converter unit 23 is generally transmitted over a short distance to a binary decoder. The binary decoder, which may be similar to the decoding apparatus described in the shaft positioning mechanism of the May etal., patent, supra applies a decoding output to position a controlled apparatus 25 in conformity with the selected position of the selector unit 20.

The control unit 21, as shown in the specific embodiment in Figure 1, has a source of positive potential and a source of negative potential. These sources of potential are separated from the remainder of the control unit by a switch 5 which is placed in the control unit to provide a means of opening and closing the circuit to permit adjustments of the various elements therein.

This invention operates as follows:

Control knob 4 is rotated to select a desired position and, as shown in the specific embodiment, it may select any one of ten positions. This control knob has a plurality of contact rings or similar switching devices mechanically connected to a common shaft 30 so that, as the knob is rotated, the contact rings are rotated. These contact rings are shown as 50, 70, and 90, and rotate uniformly under the control of the rotation of the control knob 4.

If the control knob 4 is set to select position 1 or channel 1 as shown in Figure 1, and switch 5 is closed, positive voltage is applied from the positive voltage source 17 through the lower branch of switch 5 to contact 51 of contact ring 50. This positive voltage is then applied to wire 13 through the circuit including contact ring 50 and contact 61. Wire 13 is one of the three wires connecting the control unit with the controlled unit. The fourth wire which is shown as wire 14 is a common ground connection and may be replaced with an earth return.

The positive potential which is applied to wire 13 is thus applied to the control unit of Figure 2 and diodes 112 and 114. With a positive voltage applied to these diodes, a circuit is created for the flow of current through the winding relay 150, including diode 112 and ground.

The current will flow through diode 112 and not through diode 114 since these diodes are polarity-sensitive devices which permit the flow of current through them in only one direction. This current flowing through the winding of relay 150 operates relay 150, thereby connecting the ground through contacts 151 to the binary decoder 24.

It is to be noted that wire 13 will carry trinary code combinations as depicted in this illustrative embodiment. Positive potential, negative potential, and ground potential are all utilized on this particular wire to present the over-all code combinations of this invention.

Now, if the channel selector 4 is rotated to select code position 2, a positive voltage will be applied from the positive voltage source to contact ring 90 through a circuit including switch 5 and contact 92. The positive voltage thus applied to contact ring 90 is applied to wire 11 through contact 82. This positive voltage or potential is then applied to the winding of relay 120 by wire 14 and causes a current to flow in the winding of relay 120 to ground. The current flowing through the winding of relay 120 operates relay 120, thereby connecting ground potential through contact 121 to the binary decoder and thence to the controlled apparatus 25, thereby aligning the controlled apparatus with the position selected by the control knob 4.

Thus, another predetermined position is selected by the channel selector, a code generated by the binary-trinary coder, the code transmitted by the transmission wires to the converter-repeater unit and then applied to the decoder and the controlled apparatus to match the controlled apparatus to the selector unit.

The code combinations of potentials which are impressed on wire 11 will be binary code combinations, inasmuch as the connections to contact ring 90 are connected either to no potential or to the positive potential source.

If the channel selector knob 4 is now rotated to select position 8, positive potential is applied from the positive potential source to contact ring 50 through switch 5 and contact 58. This positive potential is then applied to wire 13 and will cause relay 150 to operate as hereinbefore described for the selection of position 1. At the same time, the negative potential 16 is applied to contact 78 of slip ring 70 through switch 5. This negative potential is connected to diodes 113 and 111 through a circuit including contact 81 and wire 12. A negative potential applied to diodes 113 and 111 will cause a current to pass through diode 113 and the winding of relay 140 to ground. A negative voltage thus applied to diode 111 is the wrong polarity to operate the polarity-sensitive device. The current flowing through the winding of relay 140 will cause relay 140 to operate and apply ground potential through contact 141 to the binary decoder and thence to the controlled apparatus. Simultaneously, the positive potential is applied to contact 98 through switch 5 and contact ring 90. This positive potential will operate relay 120 as hereinbefore described for the selection of position 2 will similarly apply ground potential through ground contact 121 to the binary decoder.

Thus, there is applied to the binary decoder a plurality of binary codes which, when decoded and applied to the controlled apparatus, will match the controlled apparatus with the selector unit. The remainder of the positions to which the selector unit may be rotated will cause relays 120, 130, 140, 150, and 160 to operate in a predetermined manner so that the proper binary code is applied from the contacts of these relays to the binary decoder. The application of the potential combination of the various potentials to the wires 11, 12, and 13, in trinary and/or binary code combinations, will be similar for the remainder of the selected positions as hereinbefore described in detail for three selected positions. The operation of the converter-repeater unit on all positions will follow the pattern established by the detailed descriptions of the three selected positions.

Wire 14 is a ground return connection and is not included in the number of wires connecting the control and controlled units when computing the possible code combinations in their relationship to the number of wires being used. This is because wire 14 may be replaced by an earth return at each unit.

Although this invention has been described with respect to a particular embodiment thereof, it is not to be so limited, as changes and modifications may be made therein which are within the full intended scope of the invention as defined by the appended claims.

What is claimed is:

1. A remote control system including a control unit and a controlled unit, said control unit comprising a selection control means for selecting a predetermined selective position from a plurality of possible selection positions, a plurality of sources of potential, and coding means for generating individual indicia for each of said possible selection positions comprising a plurality of rotating contacts and a plurality of stationary contacts for each rotating contact, said potentials connected to said stationary contacts in such a manner that said indicia include trinary code combinations and binary code combinations of said potentials, a plurality of transmission wires connecting said control unit to said controlled unit, the number of possible selection positions being greater than $2^n$ but less than $3^n$, where "$n$" is the number of wires, means for transmitting said indicia from said coding means to said controlled unit, said controlled unit comprising a converting means for converting the trinary code combinations generated by said coding means to binary code signals, means for repeating the binary code combinations generated by said coding means, controlled apparatus, and a decoding means connected to said converting means, said repeating means, and said controlled apparatus for positioning said controlled apparatus to conform in a predetermined manner with said selected position.

2. A remote control system including a control unit and a controlled unit, said control unit comprising a plurality of sources of potential, a selection control means including a rotating control knob for selecting a particular one of a plurality of possible selective positions, coding means for generating individual signals for each of said possible selection positions, said coding means comprising a plurality of rotating contacts controlled by said control knob and a plurality of groups of stationary contacts individual to each of said rotating contacts and different groups of said stationary contacts connected to different ones of said plurality of sources of potential so that the signals generated by said coding means are various trinary and binary code combinations of said potentials, means for transmitting said signals, transmission wires connecting said coding means of said control unit to said controlled unit, the number of possible selection positions being greater than $2^n$ but less than $3^n$ where "$n$" is the number of wires, said controlled unit comprising a converting means including a plurality of unilateral conduction devices for converting the trinary code combinations generated and transmitted by said coding means to binary code signals, repeating means for repeating the binary code combinations generated by said coding means, controlled apparatus, and a decoding means connected to said converting means, said repeating means, and said controlled apparatus for decoding the signals from said repeating means and said converting means whereby said controlled apparatus is positioned to conform in predetermined manner with said selected one of said possible selection positions.

3. A shaft positioning system comprising a control unit for selecting one of a plurality of selective positions, a controlled unit, a plurality of control wires interconnecting the control and the controlled units, the number of said wires being substantially less than the total number of said selective positions, said possible selective positions having at least the relation $2^n$ but not more than $3^n$ to number of wires, where "$n$" is the number of interconnecting control wires, a plurality of sets of switching contacts for the control unit and an equal number of sets of switching contacts for the controlled unit, the number of sets of contacts being equal to the number of interconnecting wires, a rotatable shaft in each unit, electric motor means for operating the controlled unit and for simultaneously rotating the shaft in said controlled unit, said control unit including a manually rotatable member mounted on said shaft for setting the switching contacts of the control unit in different permuted combinations including trinary and binary code combinations, said controlled unit also including means mounted on said shaft for setting the switching contacts of the controlled unit in different permuted combinations, and means for maintaining said shaft in rotation until the permuted setting of the switching contacts of the controlled unit are matched with the setting of the switching contacts of the control unit.

References Cited in the file of this patent

UNITED STATES PATENTS

| | | |
|---|---|---|
| 1,557,633 | Vernam | Oct. 20, 1925 |
| 2,046,964 | Nelson | July 7, 1936 |
| 2,459,904 | Watson | Jan. 25, 1949 |
| 2,476,673 | May et al. | July 19, 1949 |
| 2,676,289 | Wulfsberg et al. | Apr. 10, 1954 |
| 2,693,593 | Crosman | Nov. 2, 1954 |
| 2,736,017 | Marlowe et al. | Feb. 21, 1956 |
| 2,853,699 | O'Neil | Sept. 23, 1958 |